Feb. 28, 1939.   A. H. OLDHAM   2,148,637
CONTAINER
Original Filed Nov. 3, 1933   3 Sheets-Sheet 1
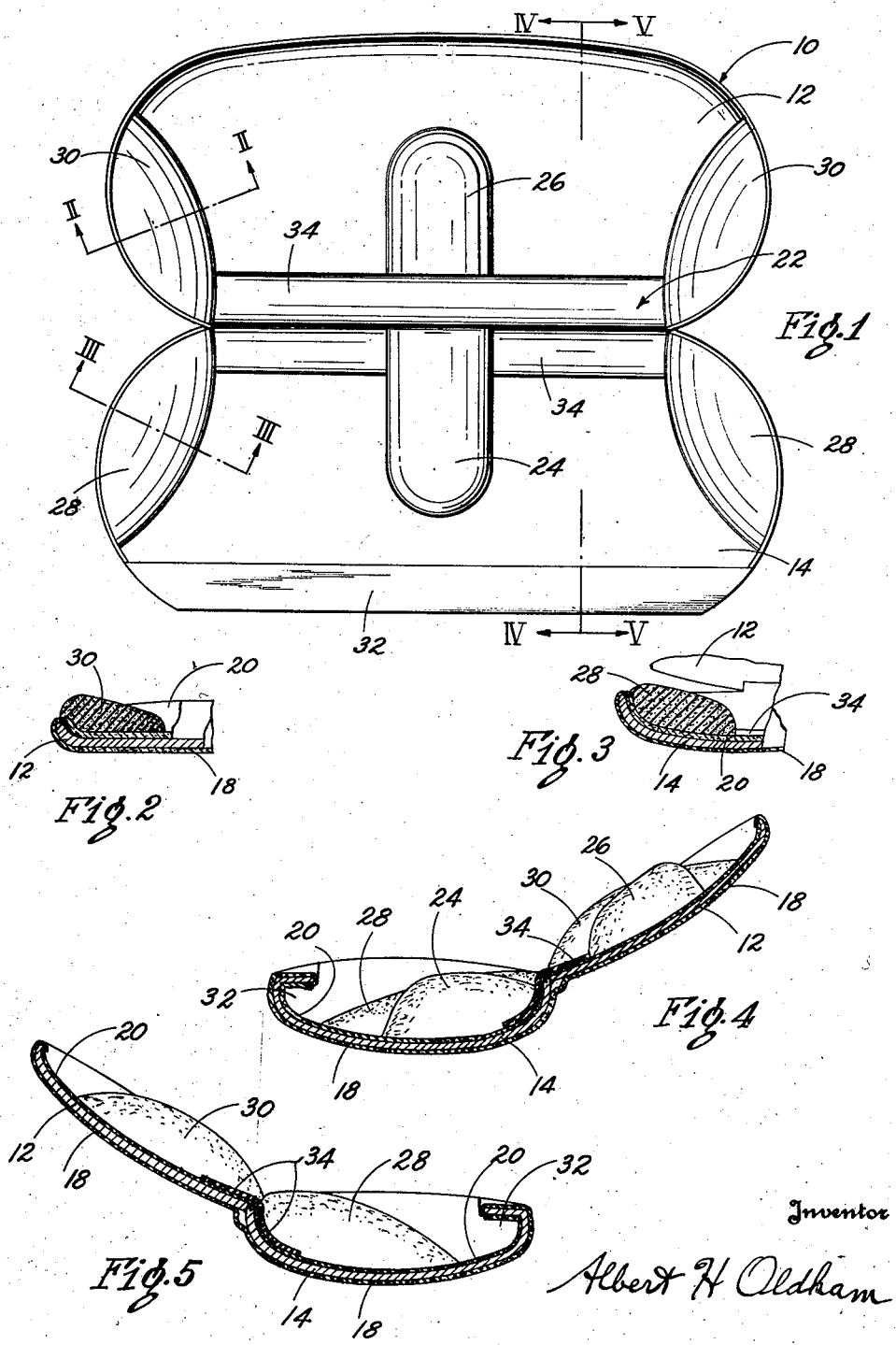
Inventor
Albert H. Oldham Feb. 28, 1939. A. H. OLDHAM 2,148,637
CONTAINER
Original Filed Nov. 3, 1933 3 Sheets-Sheet 2

Inventor
Albert H Oldham

Feb. 28, 1939.   A. H. OLDHAM   2,148,637
CONTAINER
Original Filed Nov. 3, 1933   3 Sheets-Sheet 3

Inventor
Albert H. Oldham

Patented Feb. 28, 1939

2,148,637

UNITED STATES PATENT OFFICE 2,148,637

CONTAINER

Albert H. Oldham, Pittsburgh, Pa., assignor to Millard E. Van Orden, Ithaca, N. Y.

Application November 3, 1933, Serial No. 696,561
Renewed November 30, 1937

15 Claims. (Cl. 206—6)

This invention relates to cases for eyeglasses, spectacles and the like, and more particularly is concerned with the provision of containers in which the glasses are cushioned or padded in such a manner that breakage thereof in the case is substantially impossible.

In the past spectacles, eyeglasses and similar articles have been carried in containers of various kinds. However, the most satisfactory container has been a stiff sheet metal container which is provided with a spring cover and which is lined with a plush-like material. If the glasses are of the type having temples or bows the bows are generally adapted to be folded over the glasses in such a manner that the spring of the bows somewhat tends to resiliently position and hold the glasses in the container. If the glasses are of the nose attaching type and without bows they are merely placed in the container and are not held or positioned by any means. However, with both types of glasses jars and shocks will cause definite movement of the glasses in the container with the danger of breakage. Other cases made of flexible material such as leather have likewise been employed. However, these have not proven satisfactory due to breakage of the glasses when in the pocket of the owner, lack of rigid support, etc.

In recent years there has been a tendency to eliminate or discard heavy horn or metal frames on eyeglasses and the appearance of the glasses has been materially improved as a result thereof. However, the glasses are rendered much more susceptible to breakage as a result of this frame elimination and it has been found that glasses of the frameless type and even those having frames are liable to be broken when the case containing them is accidentally dropped or even when the case is subjected to shock when in the pocket, purse or possession of the owner.

It has been proposed in the past to position spectacles in container by metallic spring means as for example Patent No. 1,080,267. However, these metal means were unsatisfactory being hard to secure in the case even at the factory. They readily cut thru the cloth covering them and did not effect a uniform gripping and clamping action over any substantial area of the glasses.

Other patents such as Nos. 1,277,210 and 1,339,330 show pads in spectacle cases, but these pads are for cleaning the lenses of the spectacles in the case when the lenses are moved relative to the pads by suitable mechanism disclosed. Patent No. 574,523 teaches the use of metal keepers or guards to hold the bows or temples of spectacles in place so that the lid of the case can be opened and closed without damage thereto. Still other patents such as Nos. 867,375, 553,325 and 547,470 show mountings and special cases for spectacles; however none of these discloses a simple practical container for uniformly and completely cushioning and supporting glasses therein by means scientifically designed and positioned.

It is an object of the present invention to provide an improved container for glasses, spectacles or the like which avoids and overcomes the above mentioned difficulties.

Another object of the invention is the provision of a glasses case in which the glasses are resiliently cushioned by means scientifically designed and positioned.

Another object of the invention is the provision of an improved container for glasses or the like in which the spring of the container lid functions to clamp the glasses between or against cushioning means so that movement thereof in the case as occasioned by jars or shocks is eliminated with breakage being likewise materially reduced.

Another object of the invention is the provision of cushioning means for use in conjunction with the usual metal spectacle case which cushioning means are molded in a single piece of unit whereby manufacturing costs and labor are reduced and so that the means can be applied to the glasses case and properly positioned therein with a minimum of time, effort and expense.

Another object of the invention is the provision of an improved cushioning means for containers for glasses, comprising sponge rubber pads properly compounded to give the desired resiliency and positioned in the case in the best manner to resiliently support the glasses.

Another object of the invention is to provide a protective pad in a container for glasses, which pad functions to replace the plush or velvet finishing cloth on the inside of the case and which likewise serves to resiliently cushion the glasses in the case.

Another object of the invention is to provide wedge shaped cushioning pads at the ends of the usual metal, spring-cover type of container which pads do not interfere with putting the glasses, and particularly the ear pieces or bows of the glasses if the glasses are of this style, in the case, and which pads function to support the glasses at both ends.

Another object of the invention is the provision of cushioning means in a metal glasses case, which means support the glasses at the nose rest or bridge thereof and which likewise grip the outer sides of the glasses so that a three-point support is provided. This cushioning means may be designed to put a slight curve or bow in the glasses whereby they are more securely held against movement.

Another object of the invention is to provide cushioning pads for spectacle cases with the pads being compounded of a quality sponge rubber or like material which will tend to take a partial set after contact with the glasses supported thereby. In this manner a resilient but partially molded and form adapting type of pad is provided.

The foregoing and other objects of the invention are achieved by the case, containers and cushioning means described hereafter and illustrated in the accompanying drawings wherein:

Fig. 1 is a plan view of one embodiment of the invention with the glasses case shown in the open position;

Fig. 2 is a cross sectional view taken on line II—II of Fig. 1;

Fig. 3 is a cross sectional view taken on line III—III of Fig. 1;

Fig. 4 is a cross sectional view taken on line IV—IV of Fig. 1;

Fig. 5 is a cross sectional view taken on line V—V of Fig. 1;

Figure 6:
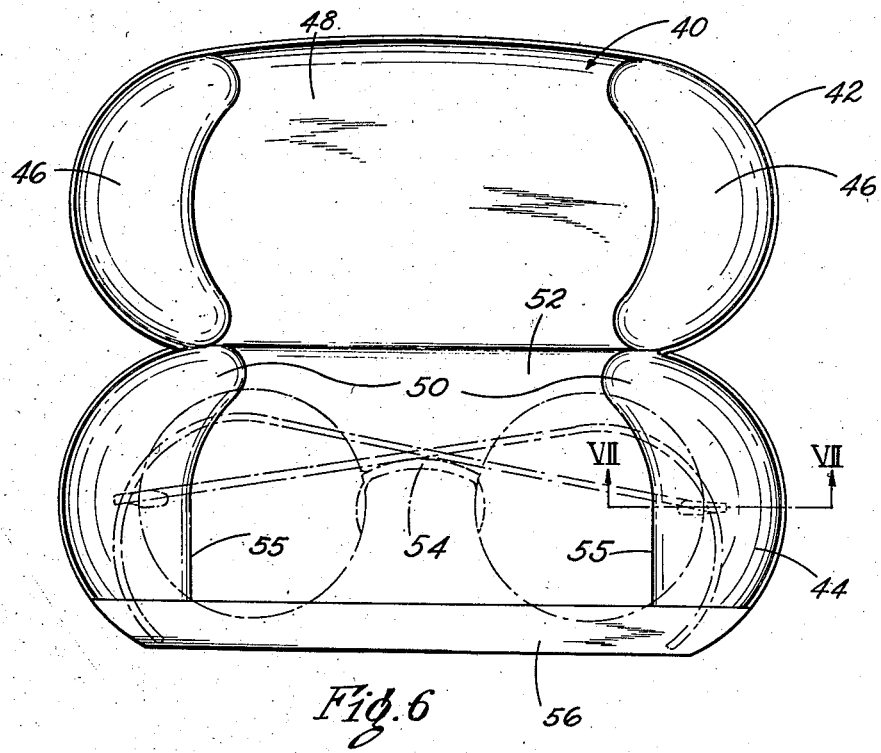
Fig. 6 is a view similar to Fig. 1 of a second embodiment of the invention.

In the embodiment of the invention illustrated in Figs. 1 to 5 the numeral 10 indicates generally a container for glasses which is of the spring lid type and which is constructed of comparatively rigid and strong sheet metal. The container 10 has the lid 12 and the container base 14 and in the cross sectional views the metal forming the container is indicated by these numerals. The container is ordinarily covered with some suitable material or fabric such as a thin artificial leather 18. The case may also be lined with any desirable plush or velvet finishing material such as that indicated at 20, which material overlaps at its edges the overturned edge of the cover 18.

The cushioning means proper is indicated generally by the numeral 22 and may comprise a pad 24 for the nose portion of the glasses which is positioned centrally of the bottom or container base 14. Associated with the pad 24 is a second nose pad 26 which is positioned in the lid 12 of the container 10. At each end of the container in the base 14 and the lid 12 pads 28 and 30 are provided which may be elliptical in shape and which preferably taper away from the overhanging well-like portion 32 of the container base 14. By tapering away from the well 32 it is more readily possible to place the glasses in the case and particularly if the glasses are provided with bows for fastening to the wearer's ears.

The various pads 24, 26, 28 and 30 are secured together by flat connector portions 34 so as to actually form one integral molded body although it is possible to cut the body to form separate pads in the lid and base of the container. It is thus possible to greatly simplify the manufacture of the pads and at the same time the matter of positioning and securing the pads in the base is rendered much easier. The cushioning pads are preferably molded from sponge rubber which has been very carefully compounded to give the desired cushioning action. In certain instances larger pads can be employed and the amount of "blow" in the sponge rubber will be increased so that the pads themselves are softer. In other instances where a more firm support is desired the sponge rubber can be made with less "blow" or air spaces so that it is somewhat stiffer. It has been found that sponge rubber is very satisfactory in that it is free from lint, is comparatively inexpensive, and can be readily molded to the proper resiliency. The invention, however, contemplates the use of other cushioning materials such as felt or the like.

The pads can be secured to the plush or velvet 20 lining the case in any desired manner. This is ordinarily accomplished, however, with a minimum of expense and effort by some suitable adhesive such as rubber cement.

The pads 24 and 26 may come together when the lid 12 is closed in a position which is somewhat out of vertical alignment with the pads 28 and 30 so that a slight curve or bow is given the glasses whereby they are positioned more securely by the tension created in the glasses themselves. The invention contemplates the spring in the lid 12 acting to clamp the lid down against the container base 14 and the resiliency in the pads 24, 26, 28 and 30 is such that the lid 12 will close completely down with the glasses in the container. Pads 24 and 26 and the pads 28 and 30 will, of course, contact over a substantial area but will yield both with respect to the cooperating pad and to the glasses whereby a very firm cushioned support is given the spectacles in the case.

It will be understood that the pads are shaped so that there will be a minimum of sharp corners to catch dust or metal portions of the glasses. The symmetry and appearance of the case is also improved thereby.

Figures 7, 8:
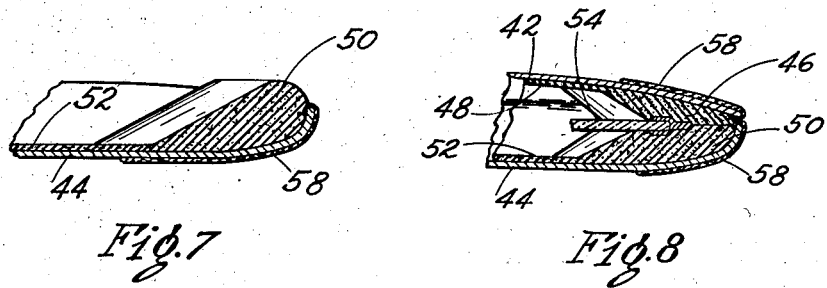
Fig. 7 is a cross sectional view taken on line VII—VII of Fig. 6.
Fig. 8 is a view similar to Fig. 7 but illustrates how the lid of the container folds down against the bottom of the container to clamp the glasses in supported position.

In the form of the invention illustrated in Figs. 6 to 8 the numeral 40 indicates generally the glasses container having a lid 42 and a base 44. Crescent shaped pads 46 are provided in the lid 42 and these pads are connected together by an integral thin flat body portion 48. Pads 50 are provided in the base 44 of the container 40 and these pads may likewise be connected by an integral, flat, thin body portion 52. It is within the concept of the invention to make the pads and the flat connecting body portions of the lid 42 and base 44 integral. However, this depends largely on the particular case installation and is not done if the pad wrinkles unduly around the hinges of the case.

The pads 46 and 50 are made in a wedge shape of reducing thickness towards the center of the case as is shown in Fig. 7 so that when the cooperating pads 46 and 50 come together they will engage with glasses shown at 54 in the manner illustrated in Fig. 8. The wedge shaping of the pads also serves to facilitate the placing of the glasses in the case. For a similar purpose the pads 50 are ordinarily provided with straight or even outwardly receding portions 55 adjacent the well 56 of the container base 44.

In this embodiment of the invention the flat connector portions 48 and 52 of the pads function to eliminate the necessity for plush or velvet linings for the case which is an item of expense. The pads are made of suitable material (see discussion of Figs. 1 to 5) such as sponge rubber and are of an appropriate color and texture whereby suitable finish is given the interior of the case. Any desired covering material such as that indicated at 58 may be employed to cover the case with the material wrapping around the edges of the case and under the pads as will be understood.

It will be appreciated that the invention contemplates securing the pads in position in the case by any suitable adhesive such as discussed above with respect to Figs. 1 to 5.

As a modification of the form of the invention shown in Figs. 6 to 8 the pads 46 and 50 could alone be employed in conjunction with the standard glasses case which would eliminate the connecting flat body portions 48 and 52. In this case it is necessary, however, to individually secure each pad in position. However, in certain instances this arrangement of parts might be found most advisable.

Figure 9:
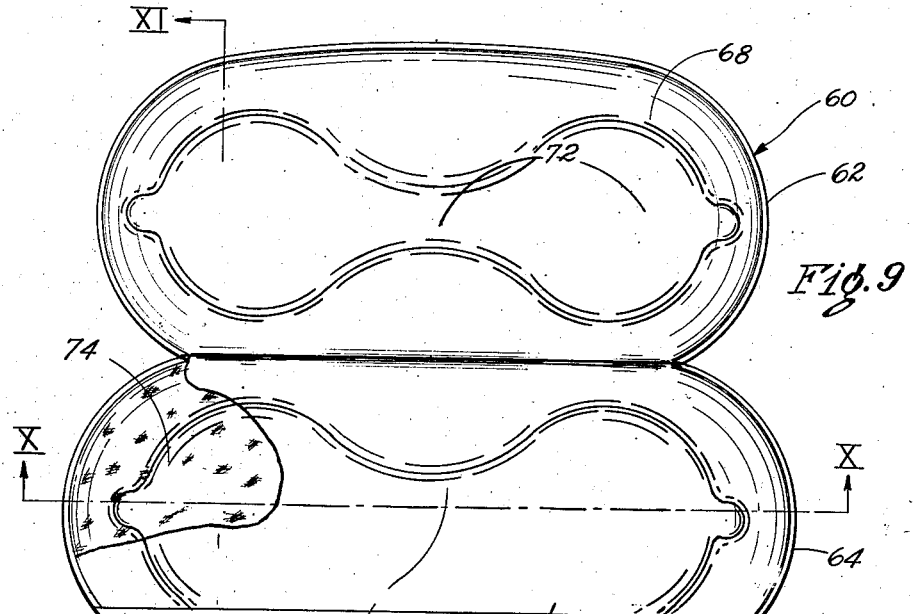
Fig. 9 is a view similar to Figs. 1 and 6, but illustrates a third embodiment of the invention.
Figure 10:
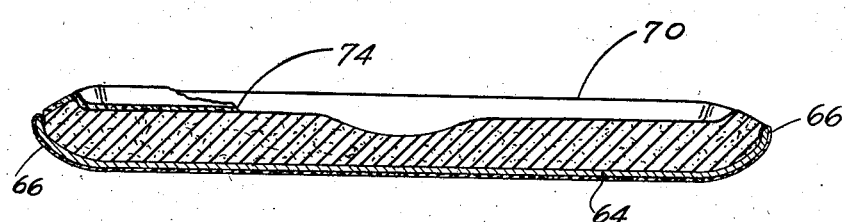
Fig. 10 is a cross sectional view taken on line X—X of Fig. 9.
Figure 11:
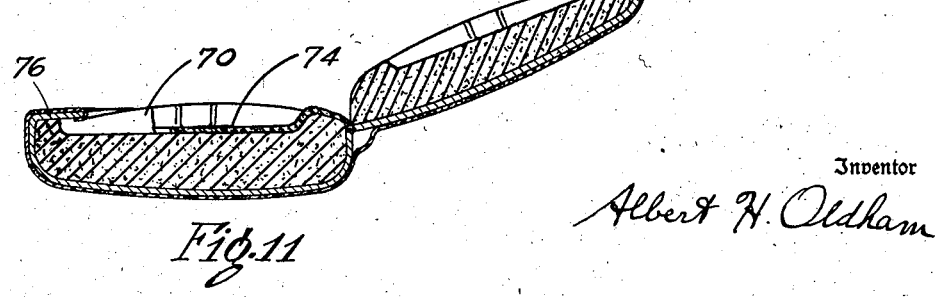
Fig. 11 is a cross sectional view taken on line XI—XI of Fig. 9.

Referring to the embodiment of the invention illustrated in Figs. 9 to 11 the numeral 60 indicates generally a spectacle case of the spring lid metal type which includes the lid 62 and the base 64. The case may be covered with any suitable finishing material such as indicated at 66. In this form of the invention pads are provided which substantially fill both the lid and base of the container. These pads are designated by the numerals 68 and 70 and are ordinarily shaped somewhat as shown in Figs. 9, 10 and 11 with the pads being relieved or reduced in thickness in certain areas 72 to "form fit" around and cushion the glasses. Thus the glasses are positioned and carried in a distinct pocket formed in the resilient cushioning material. It will be understood that even though the pads are relieved to form pockets the cushioning material defining the pockets will resiliently contact and engage with the glasses although not so strongly as if the pockets were not formed. The pads 68 and 70 can be made integral if desired by joining the same with a thin connecting portion over the hinge portion of the case. However, they preferably take the form of two distinct pads, one for the lid 62 and one for the base 64 thereby allowing the lid to close more readily. As shown in Fig. 10 the pads may be secured by any suitable adhesive directly to the lid and base and may, if desired, be covered with a plush or similar finishing cloth 74. The pad 70 is not only shaped to form pockets 72 as above described but is also relieved adjacent the well 76 of the container base 64 so that the glasses and particularly the bows or temples of the glasses can be more readily inserted into the well of the case.

The pads 68 and 70 are preferably manufactured by a molding operation from sponge rubber as discussed above with respect to the other modifications of the invention and in the present embodiment the use of sponge rubber is particularly desirable. This is because it is a definite part of the inventive concept to compound the sponge rubber in such a manner that it will readily take a partial set from the glasses placed in the container. By placing a larger percentage of reclaimed rubber in the sponge rubber compound, a product will be produced having greater form adapting qualities than ordinary sponge rubber. Thus the molded pocket 72 in the pads will be further molded to exactly the shape of the particular glasses which are used in the case whereby a very complete and satisfactory positioning and cushioning action results. It will be appreciated that while the pads adapt themselves to the contour of the glasses as above described that sufficient resiliency will be retained in the pads to adequately cushion the glasses at all times.

The spring in the lid of the container and the resiliency of the pads will of course be so related that the lid will completely close and so the pads will closely surround and contact the glasses in such a manner that the entire case will be substantially filled with cushioning means whereby a substantial packing, positioning, and firm cushioning action is provided with a consequent reduction of breakage to a minimum.

It will be recognized that various features of the invention can be employed without necessitating the use of the complete inventive concept; for example, pads may be employed in only one portion of the container, for example, only in the lid or only in the base. In a like manner the pads can be molded integrally or separately as desired. The pads can replace the plush case lining or can be used above or below and in conjunction therewith. Alteration in these features will not evade the basic concept of the invention.

The various embodiments of the invention described in detail above and illustrated in the accompanying drawings provide cases for glasses and spectacles which are superior to those heretofore known and used. The glasses are cushioned in the container by simple, inexpensive and properly placed cushioning means in such a manner that breakage of the glasses in the container is greatly reduced when carried on the person or even when subjected to dropping or other severe shocks. The pads can be placed in the container at any time, being adapted to be readily secured in used containers by the owner with a minimum of time and labor and expense. Or the cushioning means can be initially installed or incorporated with the containers during their manufacture.

In accordance with the patent statutes several embodiments of the present invention have been illustrated and described in detail. However, it will be understood that the scope of the invention is not limited thereto or thereby but is defined in the appended claims.

I claim:

1. In a glasses case, rubber cushioning means for supporting the glasses at a plurality of spaced points and means integral with the cushioning means for securing the cushioning means together, said securing means being comparatively thin and flat adjacent the central area of the lens-receiving portions of the case.

2. In a glasses case, rubber cushioning means for supporting the glasses at more than two spaced points and means molded integral with the cushioning means for securing the cushioning means together.

3. A glasses case including a molded rubber cushioning pad in the lid of the case and a molded rubber cushioning pad in the base of the case, flat molded rubber means securing the pads together and adhesive means securing the pads in the case.

4. A glasses case having a spring lid including cushioning pads in the lid and pads in the base of the case, certain of said pads being positioned to clamp on opposite sides of the glasses adjacent the nose piece and other of said pads being positioned to clamp on opposite sides of the glasses at the ends of the glasses to cushion and support the glasses at three spaced points so that movement of the glasses in the case is substantially prevented.

5. A pad for containers for glasses comprising an integral molded body of sponge rubber, a portion of said pad being adapted to contact with the glasses at one end thereof and another portion being adapted to contact the other end of the glasses, said portions being connected with a flat, thin integral molded rubber body.

6. In a glasses case the combination of cushioning pads positioned at the ends of the lid and at the ends of the base of the case and adapted to clamp on opposite sides of the ends of the glasses, said pads tapering in thickness toward the center of the case, said pads also being relieved adjacent the well of the case to allow the ready insertion of the glasses into the case.

7. In a glasses case the combination of cushioning pads positioned at the ends of the lid and at the ends of the base of the case and adapted to clamp on opposite sides of the ends of the glasses, said pads tapering in thickness toward the center of the case.

8. In a glasses case the combination of cushioning pads positioned at the ends of the lid and at the ends of the base of the case and clamping on opposite sides of the ends of the glasses when the case is closed to resiliently hold the glasses by their extreme lateral portions.

9. A container for glasses having in combination therewith sponge rubber pads for cushioning and resiliently positioning the glasses in the container, said pads being positioned to support the glasses at a slight bow.

10. A metal glasses case, sponge rubber cushioning means adhesively secured in said case to the metal thereof, said cushioning means being adapted to contact with both the lenses of the glasses and the metal portions of the glasses secured to the lenses, and cushioning means having surfaces lying out of a common plane to support glasses in the case on a curve so as to prevent movement thereof in the case.

11. In an eyeglass case, the combination of a body, a cover hinged thereto, and resilient cushioning means of sufficient bulk when uncompressed to substantially fill the major portion of the case but sufficiently soft and resilient so that when glasses are placed therein the bows and other projecting parts of the glasses will become partially embedded in the resilient means so as to be yieldingly held at various points sufficient to permit extended end motion without concentration of stress, whereby the glasses may be resiliently held from striking the end of the case and resiliently returned to substantially their original position after ordinary end impacts.

12. In an eyeglass case, the combination of a body, a cover hinged thereto, and resilient cushioning means of sufficient length and area to substantially cover glasses when placed in the case, said resilient means being so thick that the case cannot be closed on glasses without partially embedding them in the resilient cushion, said resilient means being so yielding that the embedding action does not preclude closing the cover in the ordinary manner, whereby the glasses may be resiliently held at distributed points in a bed sufficiently soft and thick to allow resilient end play.

13. In an eyeglass case, the combination of a body portion, a cover hinged thereto, and resilient cushioning means extending approximately the length and breadth of the case, said resilient means comprising a spongy material having a large number of small gripping elements adapted to resiliently grip and mold themselves to the bows and other projecting parts of eyeglasses when in the case, said spongy material being so thick that the glasses may be oscillated endwise on the resilient means while the gripping elements retain their hold and tend to return the glasses to substantially their original position.

14. In an eyeglass case, the combination of a body portion, a cover, and resilient cushioning means mounted on the cover, said resilient means having an exposed surface composed of a mass of elastic gripping elements, and being sufficiently thick so that glasses when in said case will be partially embedded in them, said cushioning means being longer than the glasses when in the case so as to provide for resilient end play.

15. In an eyeglass case, the combination of a body portion, a cover hinged thereto, cushioning means of resilient spongy material mounted on the inside of said cover and extending substantially to the longitudinal ends thereof, said cushioning means being thicker than the depth of the cover so as to project into the body portion when uncompressed, and having an exposed open cell spongy surface so that projecting parts of eyeglasses may become readily embedded therein, said case and cushion extending beyond the ends of eyeglasses when in the case so as to provide for resilient end motion.

ALBERT H. OLDHAM.